ically-mechanical Experimental Laboratory -->
United States Patent [19]
Zoellner et al.

[11] 4,040,101
[45] Aug. 2, 1977

[54] SYSTEM FOR EXTENDING THE PLAYING TIME OF VIDEO CASSETTES

[75] Inventors: Rainer Zoellner, Fuerth; Guenter Munkert, Seukendorf, both of Germany

[73] Assignee: GRUNDIG E.M.V. Elektro-Mechanische Versuchsanstalt Max Grundig, Fuerth, Germany

[21] Appl. No.: 608,101

[22] Filed: Aug. 27, 1975

[30] Foreign Application Priority Data

Oct. 17, 1974 Germany .............................. 2449423

[51] Int. Cl.$^2$ .............................................. G11B 15/44
[52] U.S. Cl. ........................................ 360/64; 360/10
[58] Field of Search ................... 360/64, 10, 108, 73, 360/84; 178/6.6 HS, 6.6 FS

[56] References Cited

U.S. PATENT DOCUMENTS 3,294,902 12/1966 Maxey ................................ 360/64 X
3,772,468 11/1973 Tatsughchi ............................ 360/73
3,911,486 10/1975 Hibbard ............................... 360/64

Primary Examiner—John W. Caldwell
Assistant Examiner—Daniel Myer

[57] ABSTRACT

A system is provided for extending the playing time of standardized video cassettes. The system utilizes a rotating head drum having mounted thereon a first set of video heads displaced 180° with respect to each other, a second set of video heads displaced by a certain amount from 180° with respect to each other, a rotating winding of a transformer, and relays to interconnect the heads of either the first or second set of heads with the rotating winding as the head drum rotates. The relays are controlled by stationary coils and logic to respond to the setting of switches to enable the system to operate at normal tape speed via the first set of heads or reduced tape speed via the second set of heads without requiring any change in the speed of rotation of the head drum.

9 Claims, 3 Drawing Figures

SYSTEM FOR EXTENDING THE PLAYING TIME OF VIDEO CASSETTES

BACKGROUND OF THE INVENTION

The present invention relates to video tape recording and more particularly to a system for extending the playing time of standardized video cassettes in which each of two rotating video heads, displaced relative to each other by 180°, records or scans one slant track per television field.

In the standard video cassette intended for home use, a magnetic tape located in a cassette is utilized. When the cassette is positioned in the video equipment, the tape is pulled from the cassette and positioned for operation. In order to permit interchangeability of the cassette (i.e., in order to insure that a cassette recorded on one machine can be played back on another machine) certain system standards have been established which are adhered to by the industry. These standards include the geometry of the slant tracks, the speed of rotation of the head drum, the number of video heads mounted on the drum, and the transport speed of the tape past the head drum. In one popular cassette system two video heads are mounted on the head drum 180° apart from each other and displaced to record or scan along one slant track. With 50 fields per second (as is common in most European countries) the head drum must therefore rotate at 1500 RPM. In order that the common line interlace of 312.5 lines per field is recorded and reproduced correctly, a tape speed must be chosen so that the spacing between the tracks (in the lengthwise direction of the tape) corresponds to an odd multiple of half lines. In the aforementioned system, this multiple was chosen as 11.

As a result of the above established standards, the maximum playing time of a cassette is limited to about an hour utilizing the thinnest tapes available. This playing time is not sufficient for certain forms of desired programs (e.g., such as full-length motion pictures). Thus, a considerable need exists for a system to extend the playing time of a standard cassette while maintaining provision for normal recording and playback capabilities.

It has heretofore been proposed (in German Pat. No. 1,437,141 for example) that the playing time of a given length of tape could be extended through the slant track method by recording only the even or odd television fields but scanning them twice during playback with the tape transport moving at roughly half the normal speed. In practice, a head drum which rotates at 1500 RPM and carries two video heads is utilized. The magnetic tape is looped 180° over the head drum. For recording, only one of the heads operates while for playing back both heads scan the same track. It is also known that in this case the two heads must no longer be precisely 180° apart from each other but the additional head position must be displaced by a slight amount from 180°. In practice this displacement distance is on the order of a millimeter and thus, it would not be practical to mount an additional head displaced by this slight amount.

The principal object of the present invention is to provide an improved video cassette machine capable of functioning in both a standard normal mode and an extended play mode.

A further object is to provide such a machine which can be readily switched from one mode to the other without requiring any intervention with the drive mechanism of the head drum.

SUMMARY OF THE INVENTION

The above and other beneficial objects and advantages are attained in accordance with the present invention by providing an improved video tape record/playback machine capable of normal as well as extended play operation. Video tape record/playback machine includes a tape transport, a tape transport drive, a rotating head drum, a motor for rotating the head drum, a first pair of video heads mounted on the head drum and displaced from each other by 180° of arc, and a transformer having a rotating winding mounted to the head drum and a stationary winding. In addition to the above, the present device further includes a second pair of video heads mounted to the head drum and displaced by an angle slightly different from 180°. In addition, means are provided to interconnect the first pair of video heads and the rotating winding when the tape transport drive is operated at a normal speed and to interconnect at least one of the video heads of the second set and the rotating winding of the transformer when the tape transport drive is operated at a lower, extended play speed. The control means includes a set of polarized relays affixed to the head drum for rotation therewith as well as stationary exciter coils which activate the relays. The exciter coils, in turn, are activated through a control logic circuit which is governed by switches set at the desired operational mode.

DETAILED DESCRIPTION OF THE PREPARED EMBODIMENT

Figure 1:
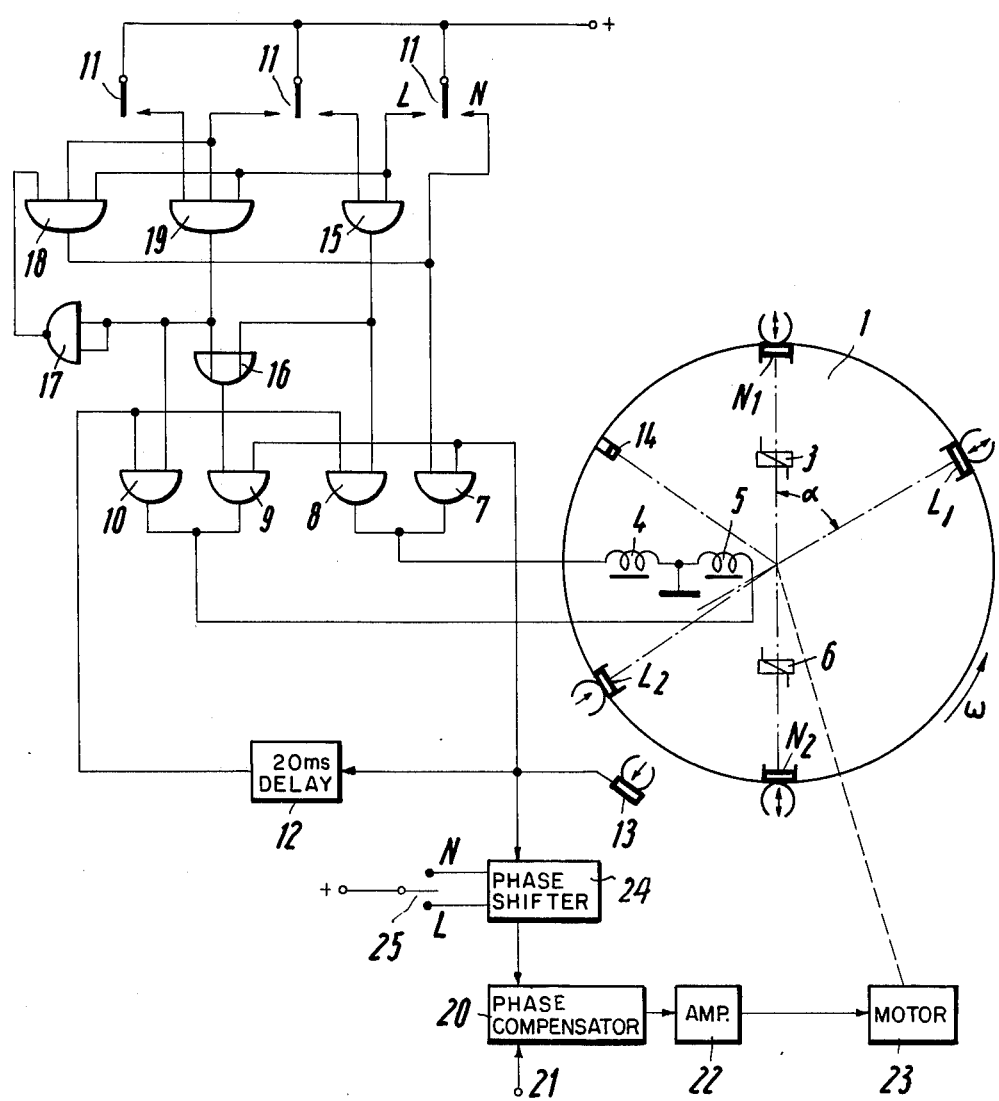
FIG. 1 is a schematic of the head drum and its control logic.

Reference is now made to the drawings wherein similar components bear the same reference numeral throughout the several views.

In FIG. 1, a rotating drum head 1 is shown carrying a first set of heads $N_1$ and $N_2$ displaced 180° apart from each other for normal (N mode) operation. For long playing (L mode) operation head $N_1$ could theoretically be used with another head displaced slightly apart from $N_2$ by a distance on the order of 1 millimeter. Since this is not practical to effect, a second set of heads $L_1$ and $L_2$ is mounted to the head drum with the displacement between heads $L_1$ and $L_2$ being off slightly from 180° as shown. The arrows adjacent to the heads $N_1$, $N_2$, $L_1$ and $L_2$ depict their operability. Accordingly, heads $N_1$, $N_2$ and $L_1$ are designed for record and playback operation while head $L_2$ is designed for playback operation only.

Figure 2:
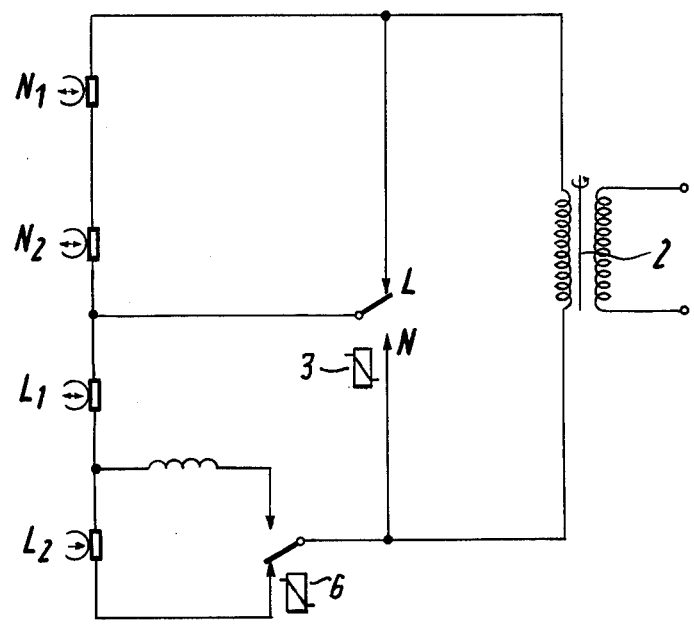
FIG. 2 is a circuit diagram of the switching arrangement between the normal and long playing heads.

Referring briefly to FIG. 2, it can be seen that a rotating transformer 2 is provided with one rotating winding and one stationary winding. Since rotating multiple transformers are expensive, only a simple transformer 2 is provided. As shown in FIG. 1, a small polarized relay 3 rotates with the head drum and serves to connect the rotating winding of the transformer with heads $N_1$–$N_2$ or $L_1$–$L_2$ as required. To this end, the relay 3 is switched by stationary exciter coils 4 and 5 as the head drum rotates. A second polarized relay 6 is also provided to connect both heads $L_1$ and $L_2$ to the transformer winding during L mode-playback but only head $L_1$ to the transformer winding during L mode-record. The electrical contacts of the polarized relays 3 and 6 are shown in FIG. 2.

The logic and switches for the control of the polarized relays 3 and 6 is depicted in FIG. 1. Thus, as shown, coil 4 is energized by the output of AND gates 7 or 8. Coil 5 is energized by the output of AND gates 9 or 10. In turn, each of the AND gates 7, 8, 9 and 10 has an input from the function switches 11 used to determine (a) L or N mode; (b) record or playback; and (c) whether the tape transport is operative or not.

In addition to the above, gates 7 and 9 each have another input connected to a position pickup 13. Pickup 13 comprises a simple transducer designed to generate a pulse each time a small permanent magnet 14 which rotates with the head drum rotates past the pickup. Thus, the polarized relay 3 is activated through coils 4 or 5 each time the magnet 14 moves past the position pickup and is therefore controlled by either the gates 7 or 9 depending on whether switch 11 is in the L or N position.

The output of pickup 13 is also delayed 20 ms through delay means 12 and then applied to gates 8 and 10. 20 ms corresponds to the time it takes for the drum head 1, rotating at 1500 RPM, to rotate through 180°. Thus, 20 ms or half a head drum rotation after relay 3 is excited by coils 4 or 5, relay 6 is excited by coils 4 or 5.

In N mode (i.e., switch 11 at N position) the electrical contacts of relay 3 are switched to N thereby connecting the heads $N_1$ and $N_2$ in series with the rotating transformer. The position of the contacts of relay 6 is immaterial since in N position relay 3 shunts past heads $L_1$ and $L_2$. The operation of the cassette system then proceeds in a conventional manner.

In L mode — record, (switch 11 at L and "record") the electrical contacts of relay 3 are switched to the L position via the AND gate 15, the OR gate 16 and AND gate 9. After 20 ms, relay 6 is energized via gates 15 and 8 and the head $L_1$ is thereby connected to rotating transformer 2.

In L mode — playback (switch 11 at L and "playback") one must differentiate between the tape in the running or stopped condition. The latter would occur, for example, for the reproduction of still pictures. It has been found that with the magnetic tape stopped, even when in the L mode, the N heads must be utilized since the L heads will incorrectly scan the tracks resulting in phase shift and poor signal to noise ratio. Thus, if switch 11 is in the L mode — playback position but the tape drive is not started, relay 3 is switched to the N position via inverted AND gate 17, AND gate 18, and AND gate 7.

When the tape drive is started (and switch 11 is thus in the L mode — playback, tape start position) the relay 3 is switched to the L position via AND gate 19, OR gate 16 and AND gate 9. In addition 20 ms later relay 6 is energized to the playback position via AND gate 10 so that the two heads $L_1$ and $L_2$ are connected in series with the transformer coil 2.

In both the N and L modes of operation the start of each slant track has to coincide with the start of a field and hence phase control of the head drum 2 is required. This is accomplished by means of a phase comparator 20 which compares pulses from the pickup 13 with reference pulses from an outside reference source 21. The reference pulses could, for example, comprise the vertical synchronous pulses separated from the video signal. The output of the comparator 21 is fed to an amplifier 22 which feeds the drive motor 23 of the head drum 1.

A phase shifter 24 is provided between the comparator 20 and pickup 13 to compensate for tolerances of the apparatus. The phase difference corresponding to the angle $\alpha$ in FIG. 1 which occurs in the transition from N to L operation is compensated for via switch 25.

Usually, during recording, the servo control of the tape transport motor compares the frequency and phase of the actual values of a tachometer generator coupled with the transport shaft with reference values which generally are derived from the frame frequency and which are simultaneously recorded on the magnetic tape as a separate synchronization track. Here the control accuracy of the tape transport becomes greater, the larger the number of pulses which are delivered by the tachometer generator per revolution of the transport shaft. The previously mentioned conditions for the mutual spacing of the slant tracks recorded on the tape and the dependence of this spacing on line duration also applies analogously to L-operation. However, since in L-operation only every other field is recorded the track spacing, as measured in the lengthwise direction of the tape, must now correspond to an odd multiple of whole lines. The result is that the transport velocity of the magnetic tape in L-operation must not be exactly equal to one-half of that in N-operation, but may be somewhat greater or smaller.

In the present case with a track spacing in N-operation corresponding to 11 half-lines, a track spacing corresponding to five whole lines must therefore be chosen in L-operation, i.e., the speed of rotation of the transport shaft must be reduced in the ratio of 5:11. The frequency of the pulses delivered by the tachometer generator is thereby also decreased in the ratio of 5:11.

In order to carry out the switching of the speed between N- and L- operation as simply as possible and, also, by purely electrical means, the number of tachometer pulses per revolution of the transport shaft is chosen so that the tachometer pulse frequencies which occur at the desired speed of the magnetic tape in N- and L- operation are integral multiples of the frame frequency. If, therefore, Z is the number of tachometer pulses per revolution of the transport shaft, and if $n_N$ and $n_L$ are its speed of rotation in N- and L-operation, the following is to apply:

$$Z \cdot n_N = p \cdot 25 \text{ and } Z \cdot n_L = 9 \cdot 25,$$

where $p$ and $q$ are integral numbers and 25 Hz is the frame frequency. Since the ratio of the speeds of rotation is the same as that of the line numbers corresponding to the track spacings, therefore, in the example above $n_N/n_L = 11/5$ and $p/q = 11/5$.

Figure 3:
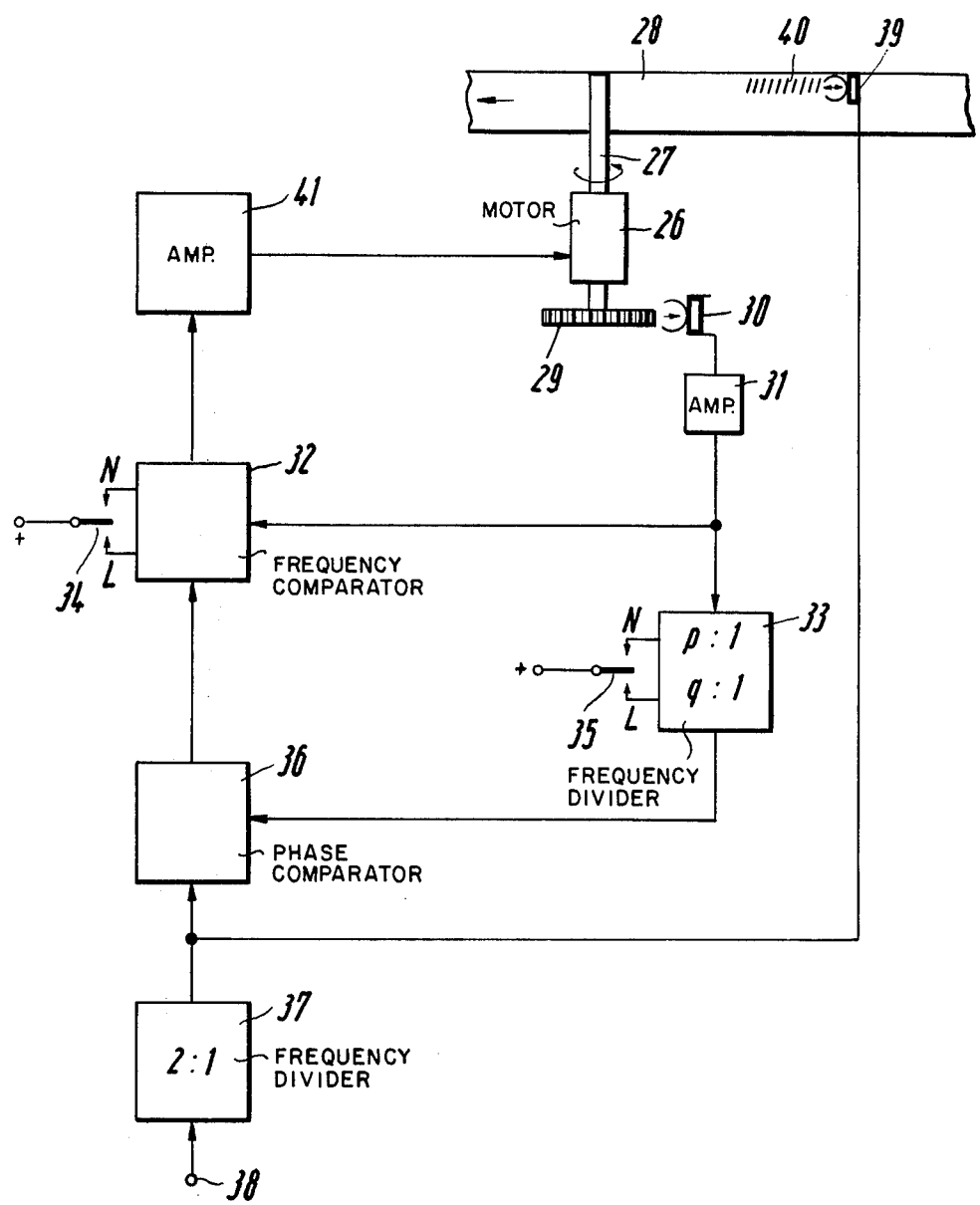
FIG. 3 is a schematic of the tape speed switching arrangement.

FIG. 3 shows the circuit diagram of the transport shaft control and of the transport speed switching arrangement. For simplicity, only the recording operation is shown. Motor 26 drives the magnetic tape in the direction of the arrow via the transport shaft 27 and a rubber pressure roller (not shown). A tachometer generator is coupled to the transport shaft. This may consist of a ferromagnetic gear 29 and a pickup 30 which generates pulses in response to rotation of the gear. The tachometer pulses are fed via an amplifier 31 to a frequency comparator 32 and a switchable frequency divider 33. The time constant of an R-C circuit or the charging time of a capacitor can serve as the reference for comparator 32. Both of these can be adjusted by simple means via the double-throw switch 34 to the pulse frequencies coming from pickup 30 in N- or L-operation. A divider 33 divides the tachometer pulse frequency down to the frame frequency, where the division ratio can be changed by means of switch 35 from $p:1$ in N-operation to $q:1$ in L-operation. The actual frame frequency appearing at the output of divider 33 is phase-compared in comparator 36 with the reference frame frequency and the error signal so produced also serves as an input to control the frequency comparator 32.

The reference frame frequency is obtained in the frequency divider 37 by halving the vertical blanking frequency, which is separated from the video signal to be recorded and is fed to the terminal 38. This frame frequency is recorded at the same time on the tape 28 as the sychronization track 40 via the stationary magnetic head 39. The resulting error signal produced in 32 controls the motor 26 via the control amplifier 41.

With the numbers given above, the number of teeth of the ferromagnetic gear tachometer 29 can, for example, be chosen as 110. If the desired speed of rotation of the motor 26 is 750 RPM in N-operation, $p = 55$ and $q = 25$ for the divider 33.

The switches 34 and 35 shown in FIG. 3 can be ganged to operate together with the N/L switch 11. To prevent operating errors, it is advisable, however, to operate the switch 25 via the control logic rather than manually.

Thus in accordance with the above, the aforementioned objectives are effectively attained.

Having thus described the invention, what is claimed is:

1. In a video tape record/playback machine of the type including a tape transport, a tape transport drive, a rotating head drum, means for rotating said head drum, a first pair of video heads mounted on said head drum and displaced from each other by 180°, and a transformer having a rotating winding mounted to said head drum and a stationary winding; the improvement comprising: a second pair of video heads mounted to said head drum and displaced from each other by an angle slightly different from 180° and control means to interconnect said first pair of video heads and said rotating winding when said tape transport drive is operated at a normal speed and to interconnect at least one of the video heads of said second pair and said rotating winding when said tape transport drive is operated at a lower, extended play speed.

2. The machine is accordance with claim 1 wherein said control means comprises:
   a first polarized relay affixed to said head drum for rotation therewith, said first relay having a first position interconnecting said first pair of video heads to said rotating winding and a second position interconnecting said second pair of video heads to said rotating winding;
   first and second stationary exciter coils in controlling relationship with said first relay to drive said first relay to said first or second position;
   switch means having a "normal" position and a "long play" position; and
   logic circuit means responsive to the normal or long play position of said switch means to activate said exciter coils to drive said first relay to said first or second position respectively.

3. The machine in accordance with claim 2 wherein said second pair of video heads comprises a record/playback head and a playback only head;
   said switch means further has a record position and a playback position and further comprising
   a second polarized relay affixed to said head drum for rotation therewith and having a playback position interconnecting both heads of said second pair of video heads with said rotating winding and a record position interconnecting only said record/playback head with said rotating winding;
   said first and second stationary exciter coils are in controlling relationship with said second relay to drive said second relay to said record or playback position; and
   said logic circuit means is responsive to said record or playback position of said switch to activate said exciter coils to drive said second relay to said record or playback position respectively.

4. The machine in accordance with claim 3 wherein said switch means further includes a "start" position indicating that said tape transport drive has been activated and said logic circuit means is responsive to said start position of said switch to activate said exciter coils to drive said first relay to said first position regardless of whether said switch is in said normal or long play position.

5. The machine in accordance with claim 1 further comprising a servo control connected to said tape transport drive, a tachometer generator secured to said tape transport drive adapted to generate pulses responsive to the rotational speed of said drive; a tape transported past said head drum by said tape transport, said tape having thereon first and second slant tracks, and the nominal output of said tachometer generator at said normal and lower speeds are integral multiples of the frame frequency of said slant tracks.

6. The machine in accordance with claim 5 further comprising:
   a divider connected to the output of said tachometer generator, said divider having a first state to divide the output of said tachometer generator by a first fixed integer to reduce it to the frame frequency when said tape transport operates at normal speed and a second state to divide the output of said tachometer generator by a second fixed integer to reduce it to the frame frequency when said tape transport operates at a lower speed;
   a comparator having a first input from said divider, a second input from a reference pulse source, and an output in controlling relationship with said servo control;
   a reference pulse source; and
   means for switching said reference pulse source between a first state to generate reference pulses corresponding to said normal speed and a second state to generate reference pulses corresponding to said lower speed.

7. Video tape cassette recorder provided for the use of standardized video cassettes and for extending the playing time of said video cassettes, said recorder including a tape transport mechanism capable of driving the tape at a normal standardized speed and at essentially half the standardized speed, a rotating head drum with a first pair of video heads displaced from each other by 180° and with a second pair of video heads displayed from each other by an angle slightly different from 180° and displaced from said first pair by a suitable angle; a transformer with one stationary winding and one rotating winding mounted to said head drum, said head drum being equipped with a first polarized relay to connect said first or said second pair of video heads to said rotating transformer winding and with a second polarized relay to connect one or both of said second pair of video heads to said rotating transformer winding; said first and said second polarized relays being displaced from each other by 180° and being actuated in both positions by first and second stationary coils excited through logic circuits under the control of position pulses of said head drum and of the switching mode of operative switches, said operative switches being shiftable between normal or long play or record or playback positions.

8. A video tape cassette recorder in accordance with claim 7 wherein said operative switches include a special switch for the start and the stop of the tape transport drive; said special switch being interconnected with said logic circuits so as to connect in the stop position of said special switch said first pair of video heads to said rotating transformer winding regardless of whether said respective operative switch is in the normal or in the long play mode position.

9. A video tape cassette recorder in accordance with claim 7 further comprising a tachometer generator and a frequency divider for the output pulses of said tachometer generator; said tachometer generator being secured to and producing a plurality of pulses per revolution of said tape transport drive; the frequency of said tachometer generator output pulses being an integral multiple of the frame frequency of the video signal at both the rated normal and the rated low speed of said tape transport drive; and said frequency divider being switchable between two division factors so as to divide to frame frequency the frequency of said tachometer generator output pulses at both, the rated normal and the rated low speed of said tape transport drive.

* * * * *